(12) United States Patent
Everhart et al.

(10) Patent No.: US 9,832,174 B2
(45) Date of Patent: Nov. 28, 2017

(54) AUTHENTICATION FOR CLUSTER PEERING

(71) Applicant: NetApp, Inc., Sunnyvale, CA (US)

(72) Inventors: Craig Everhart, Pittsburgh, PA (US); Subhash Sankuratripati, Playa Vista, CA (US)

(73) Assignee: NetApp, Inc., Sunnyvale, CA (US)

( * ) Notice: Subject to any disclaimer, the term of this patent is extended or adjusted under 35 U.S.C. 154(b) by 192 days.

(21) Appl. No.: 14/823,740

(22) Filed: Aug. 11, 2015

(65) Prior Publication Data

US 2017/0048212 A1  Feb. 16, 2017

(51) Int. Cl.
*H04L 9/32*  (2006.01)
*H04L 29/06*  (2006.01)

(52) U.S. Cl.
CPC .......... *H04L 63/061* (2013.01); *H04L 63/065* (2013.01); *H04L 63/083* (2013.01)

(58) Field of Classification Search
CPC .... H04L 63/061; H04L 63/065; H04L 63/083
USPC ........................................................ 713/171
See application file for complete search history.

(56) References Cited

U.S. PATENT DOCUMENTS

| | | | |
|---|---|---|---|
| 7,395,436 B1* | 7/2008 | Nemovicher | G06F 21/6218 713/166 |
| 7,958,368 B2* | 6/2011 | Dewey | H04L 63/0823 713/183 |
| 8,499,157 B1* | 7/2013 | Juels | H04W 12/04 380/262 |
| 8,983,066 B2* | 3/2015 | Kruys | H04L 9/0833 380/44 |
| 2016/0099922 A1* | 4/2016 | Dover | H04L 63/061 713/171 |

* cited by examiner

*Primary Examiner* — Dant Shaifer Harriman
(74) *Attorney, Agent, or Firm* — LeClairRyan, a Professional Corporation

(57) ABSTRACT

A method and system for authenticating of the pairing of computing devices is described. In an example, a passphrase is established on computing devices. The pairing between two devices is initiated by a first device by communicating independently generated data, wherein the generated data is used along with the passphrase on each of the devices to derive a common pairing key. The pairing is authenticated by using at least a first portion of the common pairing key through a key exchange protocol. Further, a shared secret code is derived using a second portion of the common pairing key and stored to be used indirectly to secure future communication between the paired devices.

18 Claims, 4 Drawing Sheets

AUTHENTICATION FOR CLUSTER PEERING

TECHNICAL FIELD

Examples described herein relate to pairing of computing devices, and more specifically, to a system and method for authenticating cluster peering using shared key generation and distribution.

BACKGROUND

A computing device can pair with another device to coordinate and share resources between them. Specifically with "peering" of clusters, conventionally, one cluster can create data protection mirroring relationships with another and can manage jobs on the peered cluster based on this relationship.

Prior techniques for cluster peering involve very few authentication techniques to make sure that data being shared is protected. For example, customer data backups at a remote location using peered clusters are usually protected from third-party hacks or dictionary attacks as customers build isolated networks used over virtual private networks (VPN) to protect their data from external attacks. However, conventional approaches provide little protection from attacks within the same data network once the data clusters are paired. A third party attacker who can see communication going across different clusters could impersonate a "peered" cluster in order to copy internal data.

Examples described herein aim to provide an authentication scheme interweaving the processing of two different authentication protocols in order to not only authenticate the pairing of two devices using a shared passphrase, but also provide a shared secret code that can be used for future communication. In the example system described herein, authentication can be achieved through minimal message exchanges between the two devices, as the passphrase and the secret code are not communicated directly from one device to another. A robust authentication system is especially important for cluster peering, where data protection schemes are more vulnerable than the data exchange during the pairing between mobile devices and/or peripherals. Cluster peer authentication is used to allow some assurance that control flow and data that are being exchanged with another cluster are in fact being exchanged with that cluster.

DETAILED DESCRIPTION

Figure 1:
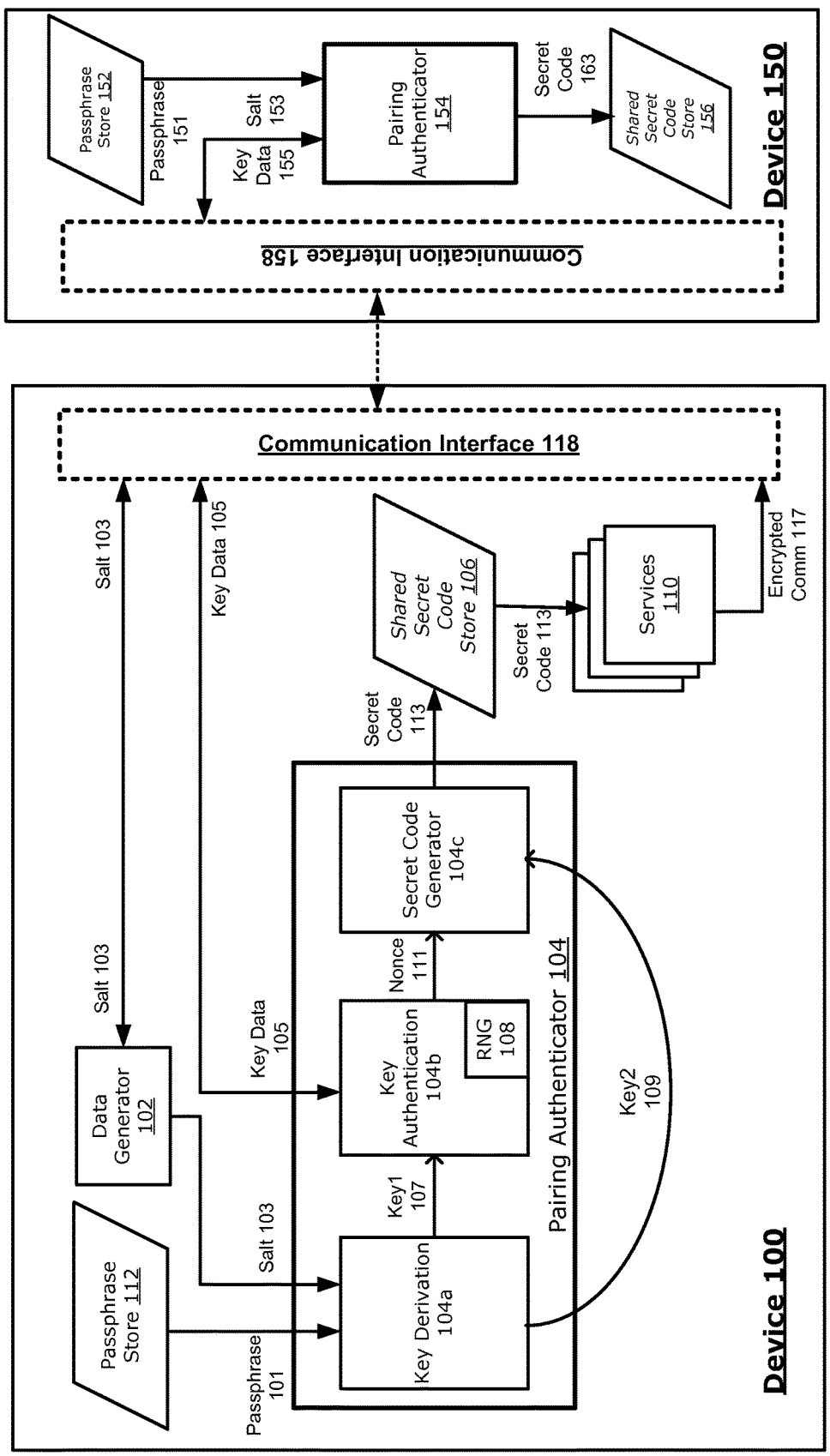
FIG. 1 illustrates an example system for authenticating the pairing of two devices, in accordance with some aspects.

Examples as described include a system and method for authenticating the pairing of two computing devices using a secured pairing protocol which simultaneously enables an encrypted mode of communication between the two paired devices. Among other benefits, a user can initiate a pairing action which results in the two devices being securely paired and in possession of cryptographic keys which enable the two devices to securely exchange communications. Moreover, the pairing protocol is implemented without the two devices exchanging any information that is the basis for authentication. Thus, examples as described not only facilitate secure pairing and communication, but serve to attain a higher level of security than would otherwise be achieved using prior approaches.

Under some conventional pairing approaches, a user manually enters some piece of information independently on the two devices being paired. Once entered, the pairing is secured based on this independently known information which is utilized as part of the pairing protocol. Under such approaches, the pairing protocol defines how the devices identify each other, and further what information is transmitted from one device to another. For example, when a user wants to pair a mobile device for the first time with a Bluetooth headset, a simple pairing protocol can be used during the initial setup based on a known PIN (usually 0000), which is used to authenticate the pairing when the user feeds the same PIN on both the devices.

Examples described herein recognize that systems which utilize authentication protocols can achieve greater security when secrets such as a shared pin or a passphrase are not exchanged between the two devices. In one aspect, a passphrase can be securely established on computing devices (e.g., by administrator or user) in a secure setting or environment, and the passphrase can then serve as a basis for pairing and establishment of the secure communication mode. As described in greater detail, the administration of the passphrase on each device is, in principle, independent of the other.

According to one aspect, once a passphrase is established on the devices that are to be paired, a first device can initiate pairing with a second device by communicating independently generated data, which can be commonly operable with the passphrase on each of the devices to derive a common pairing key. The independently generated data can correspond to random data, sometimes referred to as a "salt", which provides an additional input for implementation of a hash function. The independently generated data can also include an identifier for the device along with the salt.

In another aspect, a key derivation function can be used to derive the common pairing key, for example, PBKDF2 or Password-Based Key Derivation Function 2. In a further aspect, the first device authenticates the pairing to the second device by using at least a first portion of the common pairing key. In one example, a key exchange protocol can be used to authenticate the pairing of the devices, for example AKEP2 or Authentication Key Exchange Protocol 2. Here, for example, an AKEP2 exchange can be executed using the first portion of the common pairing key of both devices to verify whether they have the same derived common pairing key.

In another aspect, the paired devices compute a shared secret code by using at least a second portion of the common pairing key, the second portion being different from the first portion. In one example, using AKEP2 to authenticate the pairing of the two devices can also compute the shared secret code based on the second portion of the common pairing key. The secret code can be used indirectly (by deriving intermediate keys based on the secret code) to validate future communication between the paired devices.

In the context of cluster peering, whenever two peered clusters accept the same passphrase on each cluster, engaging in such secure pairing exchange results in the same shared secret code on each node of the pair of clusters. The secret code is shared within a cluster, but is not shared outside the cluster boundary.

Accordingly, examples as described enable authentication in a manner that provides simple but strong security for future communications between paired devices. Among other advantages, a long term shared secret code can be used for validating subsequent exchanges between the paired devices without communicating the established passphrase or the computed shared secret code from one device to another. Additionally, such an authentication scheme has no visible impact except at set-up time for connections between the devices.

In the context of clusters, using the system and method disclosed herein, a pairwise cluster peering relationship can be authenticated and a shared secret code can be computed so that the nodes of each cluster can use it to validate any inter-cluster communication between the two clusters, even though the shared secret code itself may not have previously traversed the inter-cluster interconnect.

Applications used by the clusters can remain unaware of the authentication of the peering relationship. The application facing Application Program Interface (API) does not change, or changes in an upward-compatible way. The authentication of the peering relationship is visible to the administrator, but applications do not need to change to take advantage of it.

The term "peering" and variants thereof refer to pairing of clusters in order to establish an ongoing trusted relationship between them.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried and/or executed. In particular, the numerous machines shown in some examples include processor(s) and various forms of memory for holding data and instructions. Examples of computer-readable media include permanent memory storage devices, such as hard drives on personal computers or servers. Other examples of computer storage media include portable storage units, such as CD or DVD units, flash or solid state memory (such as carried on many cell phones and consumer electronic devices) and magnetic memory. Computers, terminals, network enabled devices (e.g., mobile devices such as cell phones) are the examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. The processing is performed by interconnected gates.

System Overview

FIG. 1 illustrates an example system for authenticating for pairing of two devices, shown in device 100 and device 150, in accordance with some aspects. Both device 100 and device 150 include similar components with respect to the authentication system, but certain components in device 150 are not shown in FIG. 1 to make it clearer and avoid redundancy. In an example of FIG. 1, initiating device 100 is assumed to initiate pairing with receptive device 150. Device 100 and device 150 can each correspond to a computing device that can pair with another device. For example, device 100 and device 150 can each correspond to a device that is capable of paring with another device using Bluetooth. In such examples, device 100 and device 150 can each correspond to, for example, a mobile computing device, tablet or tablet hybrid ("phablet"), wearable electronic device (e.g., watch or eyeglass), laptop (e.g., convertible, utltramobile, etc.) or portable workstation.

Device 100 and device 150 can combine to implement an authentication system, which includes at least passphrase store 112, data generator 102, pairing authenticator 104, shared secret code store 106, communication interface 118, and services 110. Once the administrator establishes a passphrase 101 for pairing device 100, it can be stored in passphrase store 112. Passphrase store 112 can represent a transient storage medium or a permanent storage medium. For example, passphrase store 112 may be random access memory (RAM) or a computer disk drive, solid state drive, flash memory, etc. The passphrase can be an arbitrary text phrase of any length, which is not exchanged on the network, but established independently on each device in the network.

Data generator 102 can generate the independently generated data, or the salt 103. As described earlier, salt 103 is random data that is used as an additional input to a one-way function that hashes a password or passphrase. Salt 103 can be communicated to device 150 from device 100 through their respective communication interface 158 and communication interface 118. Similarly, Salt 153 can be communicated to device 100 from device 150, depending on which device initiates the pairing. Here, since device 100 is the initiating device, salt 153 can be communicated by device 150 to device 100.

Communication interface 118 and 158 may enable the devices 100 and 150 to communicate with one or more devices through a network using any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., Wi-Fi and WiMAX networks, or Bluetooth networks).

Passphrase 101 and salt 103 can also be sent to pairing authenticator 104 to derive the common pairing key. Pairing authenticator 104 includes at least key derivation module 104a, key authentication module 104b and secret code generator 104c. Key derivation module 104a can use passphrase 101 and salt 103 (which is the same as salt 153, communicated to device 100 from device 150) to derive a common pairing key using a key derivation function, for example, Password-Based Key Derivation Function 2 (PBKDF2). Device 150 can perform the same operations in pairing authenticator 154 using its passphrase 151 and salt 153 to derive a common pairing key of its own. According to some examples, PBKDF2 can be implemented with 10,000 iterations and a 256-bit salt value (salt 103), along with the passphrase 101 as an input, to produce a 768-bit common pairing key. In such an example, the 768-bit common pairing key derived from PBKDF2 would be the identical on both device 100 and device 150 if and only if the passphrase that has been established on the two devices, i.e. passphrase 101 and passphrase 151, are identical.

The common pairing key can be split into two portions, key1 107 and key2 109. For example, the 768-bit common pairing key derived from PBKDF2 can be split into a 512-bit key1 107 (the first portion) and a 256-bit key2 109 (the second portion). Using pairing authenticator 154, device 150 can also split its common pairing key into two portions and communicate the first portion as key data 155 to device 100 through communication interface 158.

Figure 2:
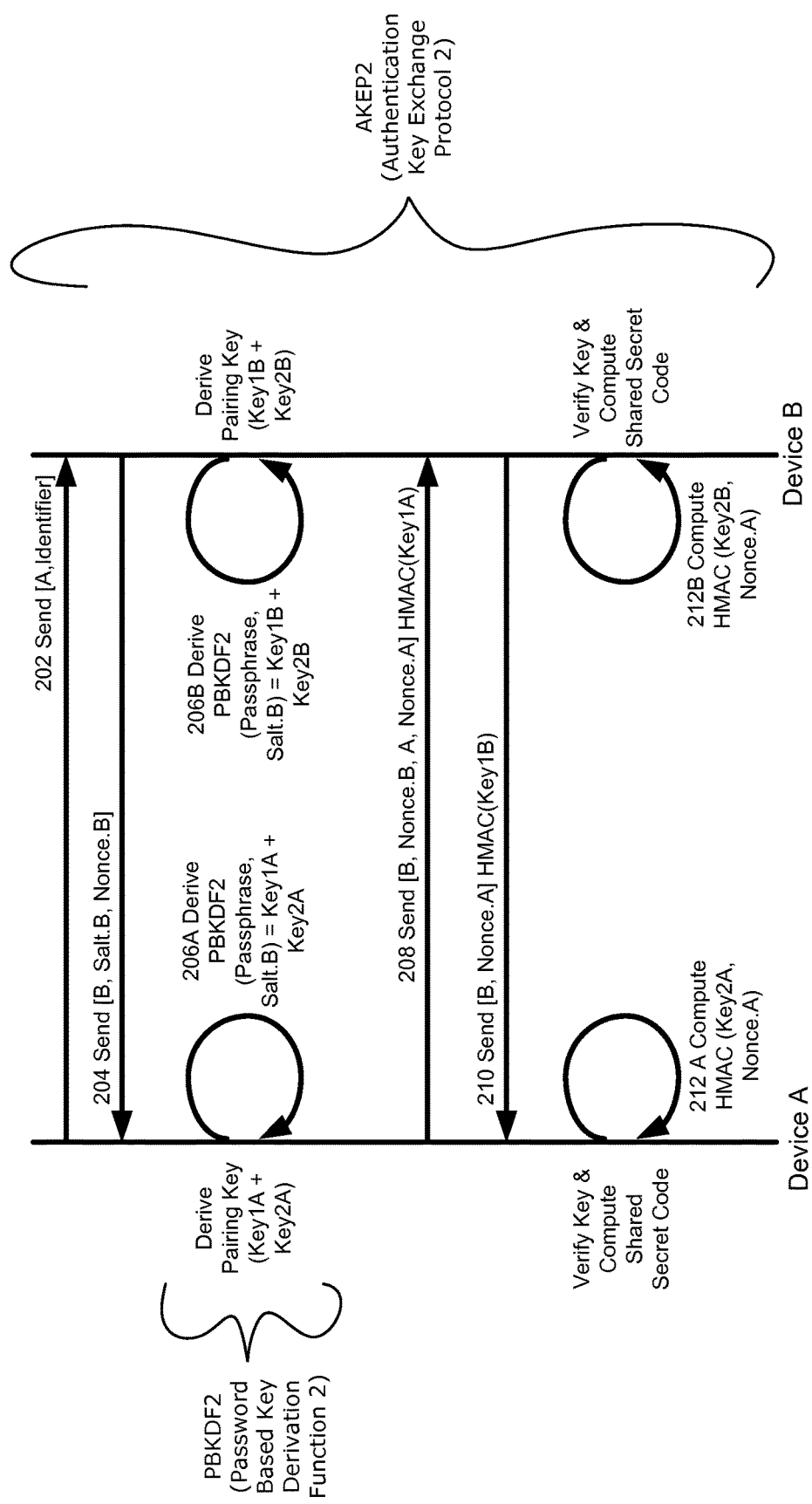
FIG. 2 illustrates an example method for authenticating the pairing of two devices, showing the sequence of communication between the two devices during authentication using certain protocols.

The first portion of the common pairing key from device 150 in key data 155 can be used in key authentication 104b to verify if the common pairing keys are identical. Based on the particular key exchange protocol used (for e.g. AKEP2), specific key data 105 and 155 can be exchanged between device 100 and device 150 to perform the verification based on using key1 107. An example of such communication is illustrated in FIG. 2 and described below. Additionally for such verification, key authentication 104b can use a random number generator (RNG) 108 to generate nonce 111. A nonce can be an arbitrary number used only once in a cryptographic communication. Nonce values are often issued in an authentication protocol to ensure that old communications cannot be used in replay attacks.

Once the common pairing key has been verified, secret code generator 104c can use nonce 111 and key2 109 to generate secret code 113. In one example, using AKEP2 automatically generates secret code 113 as part of the protocol. The computation of the secret code using AKEP2 is illustrated in detail in FIG. 2 and described below. Secret code 113 can be stored in shared secret code store 106 to be used in future communication between the two devices, which are now paired and authenticated. Device 150, upon verification of the common pairing key, also can also generate a secret code 163 which can be stored in its counterpart shared secret code store 156. If the passphrases 101 and 151 were identical, the common pairing keys on both devices would be the same, authentication should succeed, and secret code 113 and secret code 163 should be identical.

Secret code 113 can be then used by services 110 to send any encrypted communication 117 from device 100 to device 150 using communication interface 118. Services 110 may include any applications that communicate between the two devices, for example, data backup programs, management programs etc. The communications can be sent along with intermediary keys derived from secret code 113 so that device 150 can validate the communication coming in by using its own secret code 163 to check authentication.

FIG. 2 is a sequence diagram that illustrates an example method for pairing authentication, representing the communication between device A and device B, in accordance with example protocols. For the purposes of FIG. 2, PBKDF2 is the key derivation function used.

Device A initiates the pairing with device B by sending its identifier (A) to device B at step 202. If device B wants to pair with device A, it will initiate the key exchange protocol, for example AKEP2, which is illustrated next in FIG. 2 in steps 204, 208, 210, 212A and 212B. At step 204, device B initiates AKEP2 by communicating back key data to device A, which includes an identifier for device B (B), a salt generated by device B (Salt.B) and a nonce value generated by device B (Nonce.B).

The salt (Salt.B) is the random data that is generated by device B that will be used in PBKDF2 to derive the common pairing key on both devices at step 206A and 206B using the established passphrase values. Once device A receives the key data including the Salt.B value, device A can execute step 206A to determine the values of Key1A and Key2A, as based on its own copy of the passphrase value. Device A then communicates its own key data to device B at step 208, which includes the two device identifiers (A, B), the two nonce values (Nonce.A, Nonce.B) and the HMAC or key-hashed message authentication code using the first portion of the common pairing key (HMAC(Key1A)). At step 210, device B can verify if the HMAC derived from the first portion of the common pairing key received from device A matches the HMAC derived from the first portion of the common pairing key derived by its pairing authenticator, Key1B. This communication enables device B to confirm that the common pairing keys match.

In response to the matching, device B sends a further communication to device A, which includes its identifier (B), the nonce value from device A (Nonce.A) and the HMAC derived from the first portion of its pairing key (HMAC(Key1B)). This communication enables device A to also confirm that the common pairing keys match. The communication between device A and device B in steps 202, 204, 208 and 210 is referred to as key data 105 and key data 155 in FIG. 1.

Once device A verifies that the HMAC derived from the common pairing key is identical on both devices, it is now paired with device B and the pairing is authenticated. As the last step in AKEP2, device A and device B use the second portion of the common pairing key, respectively Key2A and Key2B to compute the long term shared secret code in steps 212A and 212B. The secret code is computed by getting the HMAC or key-hashed message authentication code of the second portion of the common pairing key (HMAC (Key2A) and HMAC(Key2B)). Once the secret code is computed, it can be used indirectly to validate the future communication between the now paired and authenticated devices, device A and device B.

The discussion of FIG. 1 and FIG. 2 assume that both devices have an established passphrase value. However, this need not be the case. In an alternate embodiment, referring to FIG. 2, device B can initiate pairing with device A by executing a mirror of step 202. If there is no passphrase established on device A, a particular error can be sent to device B indicating that device A has no interest in pairing. At that point, device B can still execute step 206B using its salt value, Salt.B, and store the derived common pairing key, Key1B+Key2B, awaiting a future message from Device A. Once device A is ready to pair, it can re-initiate the pairing as described above with reference to FIG. 2.

In another alternate embodiment, device A and device B can have different established passphrases. Due to the different passphrases, the derived common pairing keys can be different and the HMAC values derived from Key 1 would not match. Here, device A can become the receptive device and generate a salt value, Salt.A, which can be used in an alternate step 206A, to derive another common pairing key. Once the alternate common pairing key is derived, device A can wait for device B to re-initiate pairing. This allows the two devices to authenticate pairing and compute and store a shared secret code when the passphrase given to one of the devices matches the most recent passphrase given to the other device.

Methodology

Figure 3:
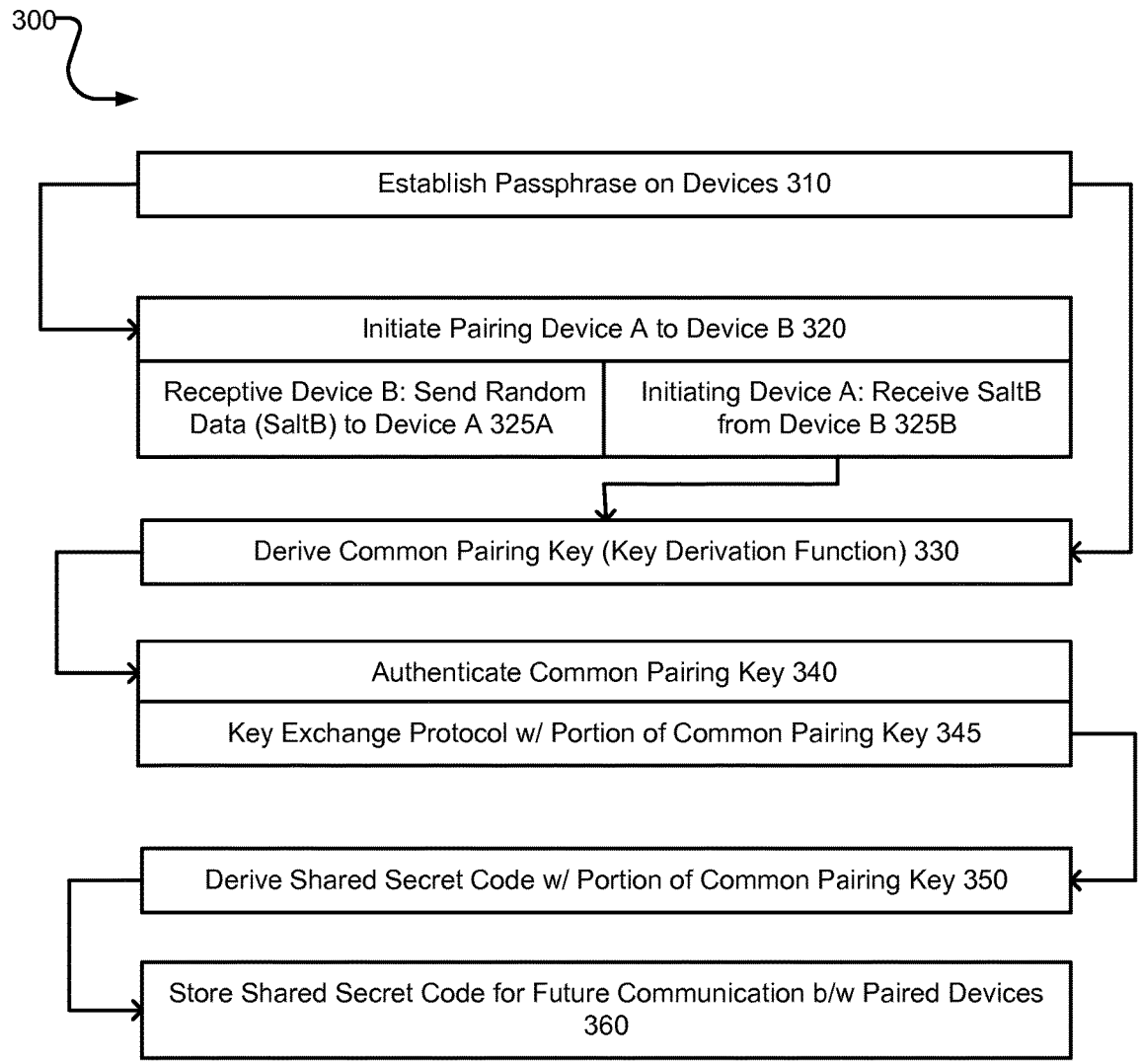
FIG. 3 illustrates an example method for authenticating the pairing of two devices, in accordance with some aspects.

FIG. 3 illustrates an example method for authenticating for pairing of two devices, in accordance with some aspects.

While operations of an example such as shown are provided below in context of specific components of FIG. 1, modules or systems of the device 100, it will be appreciated that these operations need not necessarily be performed by the specific components identified, and could be performed by a variety of components and modules, potentially distributed over a number of machines. Accordingly, references may be made to elements of device 100 for the purpose of illustrating suitable components or elements for performing a step or sub step being described. Alternatively, at least certain ones of the variety of components and modules described in device 100 can be arranged within a single hardware, software, or firmware component. It will also be appreciated that some of the steps of an example as provided may be performed in parallel or in a different order than illustrated.

With reference to FIG. 3, the administrator for the devices to be paired establishes a passphrase independently on the devices (310). The passphrase can be established in any way possible as long as it is not communicated between the devices. In context of cluster peering, the administrators of the two clusters to be paired must agree on a passphrase and establish it separately on their respective cluster.

To initiate pairing of device A to device B (320), initiating device A can send its identifier to receptive device B. Random data or salt (SaltB) which is generated and stored on receptive device B is then sent to initiating device A to further the pairing process (325A). Once initiating device A receives the salt (SaltB) from receptive device B (325B), both device A and device B then derive the common pairing key based on the established passphrase and SaltB using a key derivation function (330). In one example illustrated in FIG. 2, Password-Based Key Derivation Function 2 or PBKDF2 may be used to derive the common pairing key.

Once the common pairing key has been derived, device A and device B can authenticate if the common pairing keys derived are identical (340). The common pairing key derived on device A will be identical to the common pairing key derived on device B if and only if the passphrase established on both devices are identical. In one example, a key exchange protocol is used with a portion of the common pairing key to authenticate the common pairing keys (345). In an example illustrated in FIG. 2, Authentication Key Exchange Protocol 2 or AKEP2 may be used to authenticate the common pairing key.

After the common pairing key has been authenticated, the authentication of the pairing of device A and device B is complete. As an additional step, a long term shared secret code is derived independently on both the device from a different portion of the common pairing key (350). In an example illustrated in FIG. 2, the AKEP2 protocol computes the secret code using the second portion of the common pairing key. The shared secret code is then stored separately in both the devices to validate any future communication between the paired devices (360). In context of cluster peering, the long-term shared secret code is not used directly in subsequent validations; rather it is used along with few pre-defined key values to produce well-defined intermediate keys that are then used for subsequent validations.

Computer System

Figure 4:
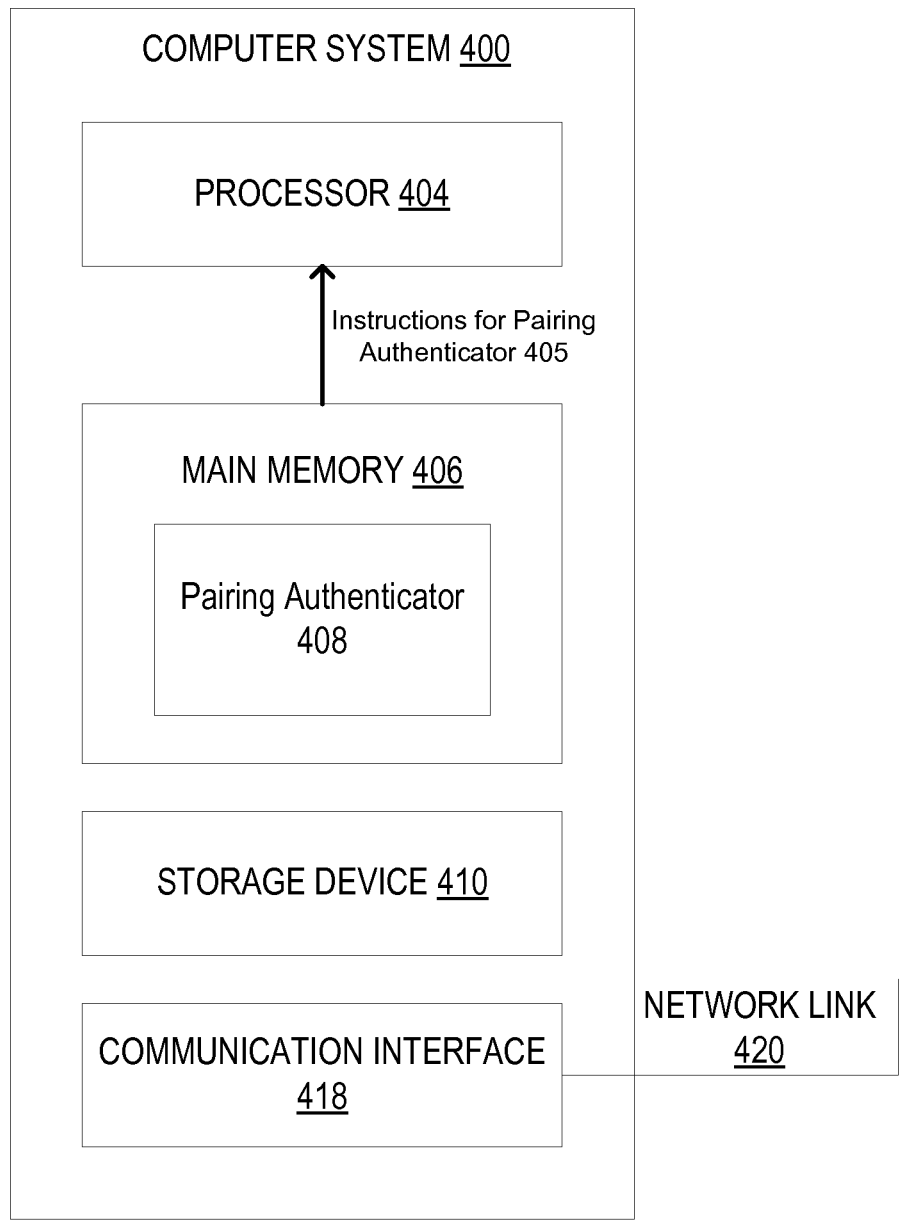
FIG. 4 is a block diagram that illustrates a computer system upon which aspects described herein may be implemented.

FIG. 4 is a block diagram that illustrates a computer system upon which aspects described herein may be implemented. For example, in the context of FIG. 1, device 100 may be implemented using one or more servers such as described by FIG. 4.

In an embodiment, computer system 400 includes processor 404, memory 406 (including non-transitory memory), storage device 410, and communication interface 418. Computer system 400 includes at least one processor 404 for processing information. Computer system 400 also includes the main memory 406, such as a random access memory (RAM) or other dynamic storage device, for storing information and instructions to be executed by processor 404. Main memory 406 also may be used for storing temporary variables or other intermediate information during execution of instructions to be executed by processor 404. Computer system 400 may also include a read only memory (ROM) or other static storage device for storing static information and instructions for processor 404. The storage device 410, such as a magnetic disk or optical disk, is provided for storing information and instructions. The communication interface 418 may enable the computer system 400 to communicate with one or more networks through use of the network link 420 and any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., Wi-Fi and WiMAX networks, or Bluetooth networks). Main memory 406 can also include a pairing authenticator 408 for authenticating paired devices, in accordance with some aspects.

Examples described herein are related to the use of computer system 400 for implementing the techniques described herein. According to one embodiment, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. For example, the instructions for pairing authenticator 405 stored in pairing authenticator 408 can be executed by processor 404 to implement the authentication of paired device, in accordance with some aspects described herein. In alternative aspects, hard-wired circuitry may be used in place of or in combination with software instructions to implement aspects described herein. Thus, aspects described are not limited to any specific combination of hardware circuitry and software.

Although illustrative aspects have been described in detail herein with reference to the accompanying drawings, variations to specific examples and details are encompassed by the disclosure. It is intended that the scope of examples described herein be defined by claims and their equivalents. Furthermore, it is contemplated that a particular feature described, either individually or as part of an embodiment, can be combined with other individually described features, or parts of other aspects. Thus, absence of describing combinations should not preclude the inventor(s) from claiming rights to such combinations.

What is claimed is:

1. A method comprising:

initiating, by a computing device, pairing with another computing device, receiving independently generated data from the another computing device, and deriving a common pairing key using at least a portion of the independently generated data and a stored passphrase that is not exchanged with the another computing device;

receiving, by the computing device, a key-hashed message authentication code (HMAC) from the another computing device;

generating, by the computing device, another HMAC using at least a first portion of the common pairing key, determining when the HMAC matches the other HMAC, and authenticating the pairing of the another computing device, when the determining indicates that the HMAC matches the other HMAC; and generating, by the computing device, a shared secret code using at least a second portion of the common pairing key different from the first portion of the common pairing key and validating one or more subsequent communications received from the another computing device using the shared secret code.

2. The method of claim 1, further comprising storing, by the computing device, the shared secret code.

3. The method of claim 1, wherein the independently generated data comprises one or more of an identifier of the another computing device, a nonce value, or randomly generated data.

4. The method of claim 1, further comprising deriving, by the computing device, the common pairing key from a key derivation function using the at least a portion of the independently generated data and the passphrase.

5. The method of claim 1, further comprising verifying, by the computing device, the first portion of the common pairing key using a key exchange protocol.

6. The method of claim 1, further comprising computing, by the computing device, the shared secret code using a key exchange protocol with the second portion of the common pairing key as an input.

7. A computing device, comprising:

a memory containing a machine readable medium comprising machine executable code having stored thereon instructions for performing a method of providing data sessions with clients that access data containers of a shared storage; and one or more hardware processors coupled to the memory, the hardware processors configured to execute the machine executable code to cause the processors to:

initiate pairing with another computing device, receive independently generated data from the another computing device, and derive a common pairing key using at least a portion of the independently generated data and a stored passphrase that is not exchanged with the another computing device;

receive a key-hashed message authentication code (HMAC) from the another computing device;

generate another HMAC using at least a first portion of the common pairing key, determine when the HMAC matches the other HMAC, and authenticate the pairing of the another computing device, when the determining indicates that the HMAC matches the other HMAC; and generate a shared secret code using at least a second portion of the common pairing key different from the first portion of the common pairing key and validating one or more subsequent communications received from the another computing device using the shared secret code.

8. The computing device of claim 7, wherein the hardware processors are further configured to execute the machine executable code to cause the hardware processors to store the shared secret code.

9. The computing device of claim 7, wherein the independently generated data comprises one or more of an identifier of the another computing device, a nonce value, or randomly generated data.

10. The computing device of claim 7, wherein the hardware processors are further configured to execute the machine executable code to cause the hardware processors to derive the common pairing key from a key derivation function using the at least a portion of the independently generated data and the passphrase.

11. The computing device of claim 7, wherein the hardware processors are further configured to execute the machine executable code to cause the hardware processors to verify the first portion of the common pairing key using a key exchange protocol.

12. The computing device of claim 7, wherein the hardware processors are further configured to execute the machine executable code to cause the hardware processors to compute the shared secret code using a key exchange protocol with the second portion of the common pairing key as an input.

13. A non-transitory machine-readable medium having stored thereon instructions for securely pairing computing devices comprising machine executable code which when executed by at least one machine, causes the machine to:

initiate pairing with another computing device, receive independently generated data from the another computing device, and derive a common pairing key using at least a portion of the independently generated data and a stored passphrase that is not exchanged with the another computing device;

receive a key-hashed message authentication code (HMAC) from the another computing device;

generate another HMAC using at least a first portion of the common pairing key, determine when the HMAC matches the other HMAC, and authenticate the pairing of the another computing device, when the determining indicates that the HMAC matches the other HMAC; and generate a shared secret code using at least a second portion of the common pairing key different from the first portion of the common pairing key and validating one or more subsequent communications received from the another computing device using the shared secret code.

14. The non-transitory machine-readable medium of claim 13, wherein the machine executable code when executed by the machine, further causes the machine to store the shared secret code.

15. The non-transitory machine-readable medium of claim 13, wherein the machine executable code when executed by the machine, further causes the machine to derive the common pairing key from a key derivation function using the at least a portion of the independently generated data and the passphrase.

16. The non-transitory machine-readable medium of claim 13, wherein the machine executable code when executed by the machine, further causes the machine to verify the first portion of the common pairing key using a key exchange protocol.

17. The non-transitory machine-readable medium of claim 13, wherein the machine executable code when executed by the machine, further causes the machine to compute the shared secret code using a key exchange protocol with the second portion of the common pairing key as an input.

18. The non-transitory machine-readable medium of claim 13, wherein wherein the independently generated data comprises one or more of an identifier of the another computing device, a nonce value, or randomly generated data.

\* \* \* \* \*